May 28, 1957  B. K. OSTBY  2,794,088
AUTOMATIC SWITCH
Filed June 16, 1953  2 Sheets-Sheet 1

Burton K. Ostby
INVENTOR.

May 28, 1957 B. K. OSTBY 2,794,088
AUTOMATIC SWITCH
Filed June 16, 1953 2 Sheets-Sheet 2
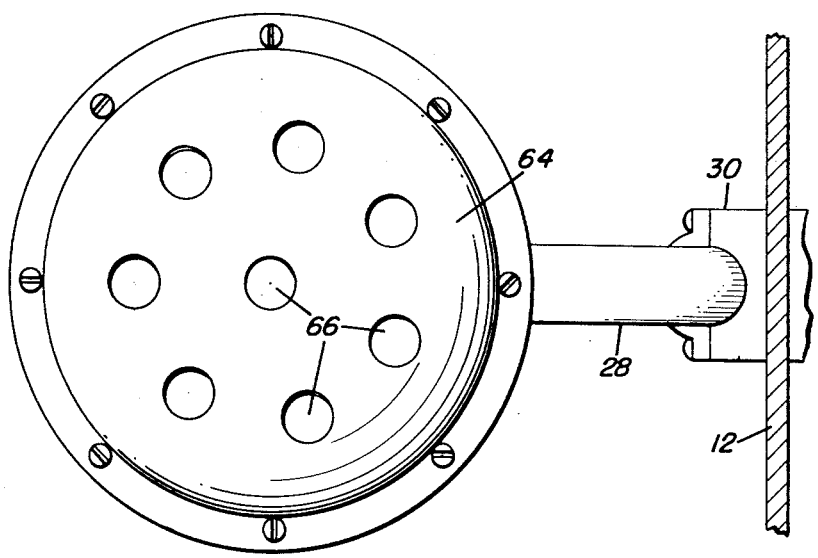
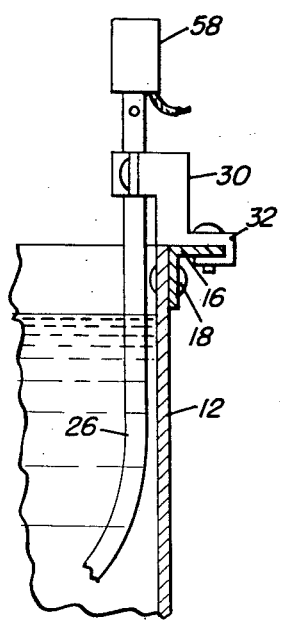
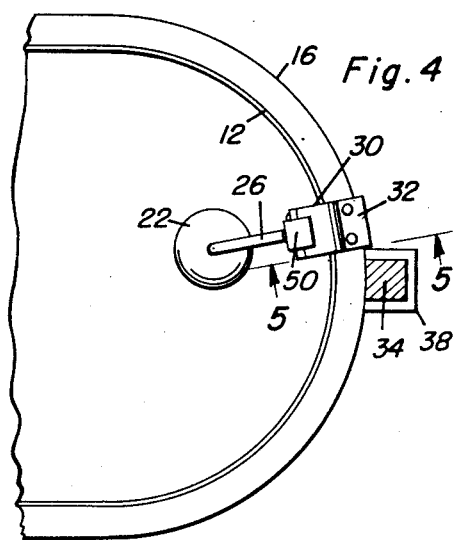
Burton K. Ostby
INVENTOR.

United States Patent Office 2,794,088
Patented May 28, 1957

2,794,088

AUTOMATIC SWITCH

Burton K. Ostby, McCabe, Mont.

Application June 16, 1953, Serial No. 362,073

3 Claims. (Cl. 200—83)

This invention relates to an automatic switch, and particularly to a switch assembly intended to be suspended within the body of water within a tank to be responsive to the water level in the tank.

In the practice of animal husbandry, it is customary to provide watering troughs for the farm animals and other stock so that the stock may have ready access to water at any time. It is then customary to provide any suitable means for providing water to make up the water as removed from the trough by the stock. In normal practice, it usually happens that a pump is utilized to pump water into the trough as it is removed by the stock. Various types of switch assemblies have been provided for starting the pump in response to a low level of water in the trough. Most of these switches utilize floats responsive to the water level, and at least the float portion is exposed at the top surface of the water where it may be contacted by the stock and cause mis-operation of the device, or it may be readily frozen and damaged in cold weather.

The present invention provides an automatic switch assembly which is located in the watering trough in spaced relation from the sides and the bottom of the trough and immersed in the water in the trough so that it is protected from contact with the stock utilizing the trough and also spaced from the bottom so that freezing on the walls of the tank will have a minimum effect on the switch. The switch assembly according to the present invention is provided of a substantially cup-like housing having a tubular connection connected thereto in water-tight relation and mounted at a point above the water level in the tank and extending therein so that the housing is supported in spaced relation from the surface of the water and also from the sides and bottom of the tank. The bottom end of the container is provided with an opening which is closed with a flexible diaphragm which will therefore move in response to the variation of pressure of the water in the tank so that the lowering of the water level will decrease the pressure applied to the diaphragm while an increase of depth of water will increase the pressure applied to the diaphragm and the consequent flexing thereof so that a switch element mounted within the housing may be actuated in response to the flexing of the diaphragm. A concave arcuate limit member is provided in the housing adjacent the flexible diaphragm so that the diaphragm is limited in its inward motion so that excessive pressure will not rupture the diaphragm or cause excessive motion of the switch actuating element which might injure the switch.

Accordingly, it is an object of the present invention to provide an improved automatic switch.

It is a further object of this invention to provide a control switch which can be mounted in a watering tank.

It is another object of this invention to provide an automatic control switch responsive to the level of water in a watering tank.

It is still another object of the invention to provide a closed container maintaining a switch responsive to the fluid level in a watering tank.

It is a further object of this invention to provide a switch automatically responsive to the depth of water in the container.

It is a further object of the invention to provide a switch protective against excessive pressure.

Other objects and many of the attendant advantages of this invention will be apparent from the following detailed description taken in conjunction with the accompanying drawing in which:

Figure 3 is an enlarged bottom plan view of the switch chamber taken substantially on the plane indicated by the line 3—3 of Figure 2;

Figure 4 is a top plan view of the switch as installed in a watering tank; and,

Figure 5 is a sectional view taken substantially on the plane indicated by the line 5—5 of Figure 4 and showing a mounting for the switch assembly.

Figure 1:
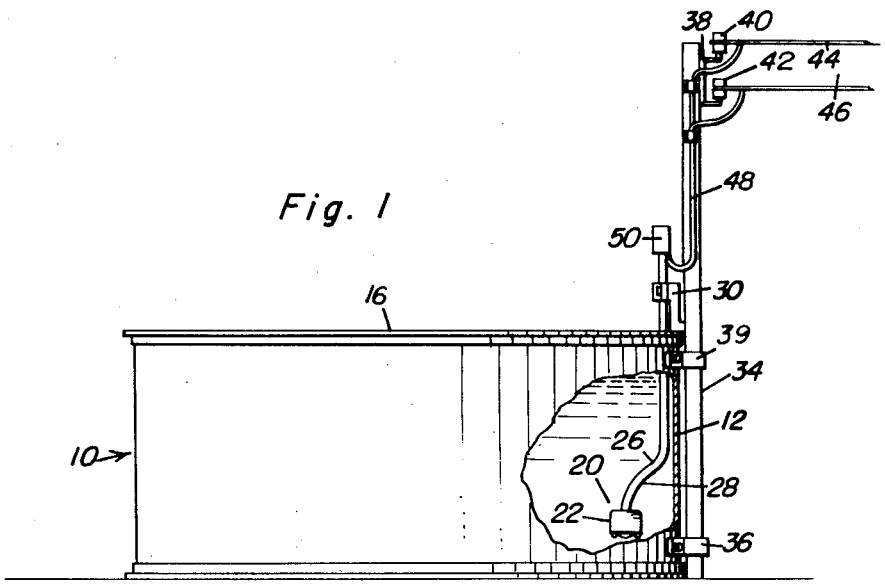
Figure 1 is an elevational view of a watering tank with parts broken away and in section to show the switch housing in operative position therein.
Figure 2:
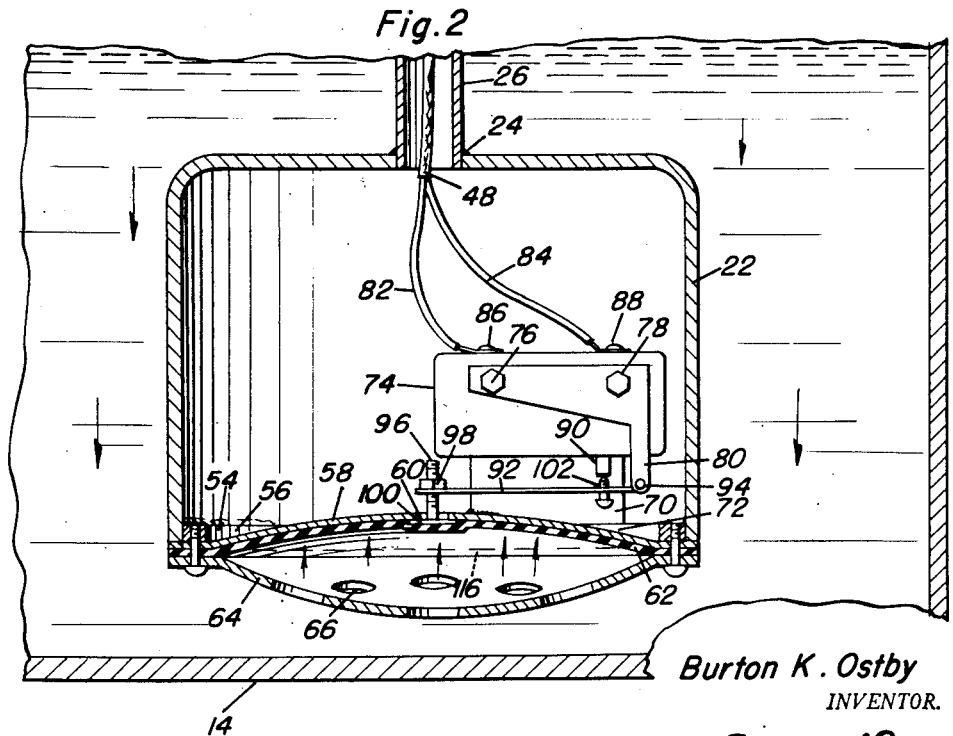
Figure 2 is an enlarged vertical section through the switch chamber showing the diaphragm in contact with the limit member.

In the exemplary embodiment according to the invention, a tank 10 is provided with side walls 12, a bottom 14, and has a rim 16 constructed as an angle member around the top edge thereof. The rim 16 being connected to the tank in any suitable manner, herein indicated as rivets 18.

A switch assembly indicated generally at 20 is adapted to be suspended in the fluid such as water contained in the tank 10. The switch assembly 20 comprises a cup-like container 22 having an aperture 24 in the top portion thereof into which a substantially tubular body 26 is integrally connected in water-tight relation by any suitable manner. The tubular member 26 is provided with an S-shaped offset portion 28 adjacent the housing 22, and the upper end of the tubular member 26 is mounted in a bracket 30 which has a flange 32 secured to the rim 16 of the tank. The bracket 30 holds the tubular conduit 26 in firm relation so that the housing 22 is suspended within the body of water within the tank in spaced relation from the surface of the water and from the sides and bottom of the tank.

A standard 34 is placed in upright position adjacent the tank 10 and held in such position by means of brackets 36 and 38. An insulator supporting arm 39 is mounted adjacent the top of the standard 34 and is provided with insulators 40 and 42 to which are connected the lead lines 44 and 46 of an electrical circuit to be connected to the pump. The drop line 48 is connected to the line conductors 44 and 46 and extends downwardly along the standard 34 and enters the top of the conduit 26 through a breather box 50. The drop line 48 extends downwardly through the conduit 26 into the housing 22 and the conduit 26 and the breather head 50 also provide a breather for the housing 22 so that the air pressure within the housing 22 will be vented to the normal air pressure so that the atmospheric pressure will in no wise disturb the switch presently to be described.

The casing or housing 22 is provided adjacent the bottom end thereof with an inturned rim 54 which provides a central aperture 56 substantially coexistant with the bottom of the housing. An inwardly curved or concave plate 58 is mounted on the inturned rim 54 and is provided with an aperture 60 for a purpose presently to be described.

The opening in the lower end of the housing 22 is closed in water-tight relation by means of a flexible diaphragm 62. The flexible diaphragm is secured in place and protected by means of a protective cover 64 which is convex or extending outwardly from the housing to provide a space adjacent the diaphragm 62 and is provided with apertures 66 so that the pressure of the fluid in the tank will be transmitted to the diaphragm 62.

A switch supporting bracket 70 is mounted on the limit plate 58 by any suitable means herein indicated as welding or brazing 72. A switch body 74 is mounted on the bracket 70 by any suitable means, such as the bolts 76 and 78 which also attach to the housing 74 a pair of hinge brackets 80. Drop wires 82 and 84 carried in the drop cable 48 are connected to the terminals 86 and 88 of the switch. A switch operating member 90 extends outwardly from the switch body 74 and a switch actuating lever 92 is pivotally connected in the brackets 80 by means of a hinge pin 94. An actuating pin 96 is threadedly engaged into one end of the lever 92 and locked therein by means of a lock nut 98. Pin 96 extends through the aperture 60 in the limit plate 58 and is provided with a large contact head 100 which makes contact with the diaphragm 62 so that flexing of the diaphragm 62 will push the pin 96 upwardly and cause the actuating lever 92 to push the adjusting pin 102 into contact with the switch operating pin 90.

The head 100 on the pin 96 is of larger diameter than the aperture 60 in the limit plate 58 so that the head will move into sealing relation with the aperture 60 so that the flexible diaphragm 62 can move firmly into engagement with the limit plate 58 after which it can move no further.

In the operation of the switch assembly according to the invention, the conduit 26 will be locked into the bracket 30 to support the housing 22 at the desired depth in the body of water in the tank 10. Microswitch 74 will have been adjusted to the proper operating pressure so that when the tank is full to the proper level, the diaphragm 62 will be flexed upwardly to contact the head 100 of the pin 96 and lift the actuating arm 92 to open the switch 74. When the water level in the tank falls sufficiently the pressure will be sufficiently released so that the diaphragm will attempt to reassume its low pressure relation as shown at 110, the actuating arm 92 will fall away from the operating pin 90 so that the switch 74 will close and start the motor to pump more water into the tank.

Since the housing is completely submerged within the body of the water within the tank, it will be free from disturbance by the stock or other animals which may drink from or be in the tank. Further, since the housing is spaced from the exterior walls of the tank and from the surface of the water therein, it is not liable to be frozen and thereby disabled because of a coating of ice preventing flexing of the diaphragm.

In the event the surface of the tank should be frozen over so that the ice will exert a tremendous pressure on the unfrozen water within the body of the container, the limit plate 58 will receive the flexible diaphragm 62 and prevent excessive flexing of the diaphragm which might not only wreck the diaphragm or cause a puncture therein, but by excessive pressure on the pin 96, might bend or otherwise disable the operating arm 92 or cause excessive pressure which would disable a portion of the switch 74.

It will be apparent that the present invention provides a switch responsive to the water level in a tank which is not easily tampered with by the stock or other animals using the tank and which is completely protected from freezing or other accidents which would cause excessive pressure in the tank.

For the purpose of exemplification, a particular embodiment of the switch has been shown and described according to the present understanding thereof. However, it will be apparent to those skilled in the art, that changes and modifications can be made therein, without departing from the true spirit of the invention.

What is claimed as new is as follows:

1. For use in a water tank, a water level responsive switch comprising a water-tight housing, a conduit connected in water-tight relation to said housing and having wiring therein, said conduit being adapted to support said housing submerged in the water in said tank and in spaced relation to the walls of said tank, said housing having a bottom opening, a flexible diaphragm sealing said opening, a concave limit member mounted in said housing in proximity to said diaphragm, a bracket mounted on said limit member, a switch connected to said wiring and mounted on said bracket, a pivoted switch actuated lever connected with said switch, said limit member having a substantially centrally located aperture therein, an actuating pin secured to said actuating lever and extending through said aperture and in engagement with said diaphragm so that said lever is actuated in response to deflections of said diaphragm, and a head on said pin adapted to move into closing relation with said aperture when said diaphragm is deflected in one direction.

2. For use in a water tank, a water level responsive switch comprising a water-tight housing, a conduit connected in water-tight relation to said housing and having a wire therein, said conduit being adapted to support said housing submerged in the water in said tank and in spaced relation to the walls of said tank, said housing having a bottom opening, a flexible diaphragm sealing said opening, a concave limit member mounted in said housing in proximity to said diaphragm, a bracket mounted on said limit member, a switch mounted on said bracket, a pivoted switch actuating lever connected with said switch, said limit member having a substantially centrally located aperture therein, an actuating pin secured to said actuating lever and extending through said aperture and in engagement with said diaphragm for displacement by the diaphragm in response to deflection of said diaphragm, a head on said pin adapted to move into closing relation with said aperture when said diaphragm is deflected in one direction, and a convex perforated shield secured over said bottom opening.

3. In combination, a water level switch assembly and a stock watering tank, said assembly comprising a container mounted entirely within said tank in spaced relation to the outer surfaces and the upper edge of the tank, said container including an imperforate tubular body, a substantially rigid bottom secured in fluid-tight relation to said body, a bracket secured on said bottom, a switch mounted on said bracket within said container, a rim secured adjacent the lower end of said body, a perforated cover attached to the lower end of said body and exposed to the water in the tank, a flexible diphragm secured in fluid-tight relation between said rim and said cover, an operating lever on said switch, means operatively connecting said lever to said diaphragm for actuation by and in response to deflection of said diaphragm, a conduit secured to said fluid-tight body and supporting said body within the tank, and an electric wire extending from said switch and passed through said conduit.

References Cited in the file of this patent

UNITED STATES PATENTS

| 415,110 | Johnson | Nov. 12, 1889 |
|---|---|---|
| 1,231,561 | Briggs | July 3, 1917 |
| 1,911,530 | Raisch et al. | May 30, 1933 |
| 2,239,071 | Zeller | Apr. 22, 1941 |
| 2,377,330 | Dixon | June 5, 1945 |
| 2,419,685 | Leslie | Apr. 29, 1947 |
| 2,428,096 | Reavis | Sept. 30, 1947 |
| 2,429,440 | White | Oct. 21, 1947 |
| 2,481,612 | Nicholson | Sept. 13, 1949 |
| 2,500,457 | Hess | Mar. 14, 1950 |
| 2,514,632 | Flubacker | July 11, 1950 |
| 2,679,641 | Liles | May 25, 1954 |
| 2,680,168 | Murphy | June 1, 1954 |